Oct. 10, 1967

A. J. DE MARIA 3,345,909

DIRECTION SENSOR FOR LASER GYRO

Filed Dec. 27, 1963

INVENTOR
ANTHONY J. DeMARIA
BY David S. Fishman
ATTORNEY

United States Patent Office 3,345,909
Patented Oct. 10, 1967

3,345,909
DIRECTION SENSOR FOR LASER GYRO
Anthony J. De Maria, West Hartford, Conn., assignor to United Aircraft Corporation, East Hartford, Conn., a corporation of Delaware
Filed Dec. 27, 1963, Ser. No. 333,981
8 Claims. (Cl. 88—14)

This invention relates to a rotation rate and direction sensor. More particularly, this invention relates to a laser gyroscope system in which both rate of rotation and direction of rotation are sensed.

A rotation rate sensor employing continuous wave lasers is known in the art and has been referred to as a laser gyroscope. See the article by W. M. Macek and D. T. M. Davis, Jr., in Applied Physics Letters, vol. 2, No. 3, February 1963, pages 67 and 68. This laser gyroscope consists of four mirrors arranged to define a rectangular reflecting path, and a continuous wave laser is placed between one or more pairs of the mirrors. Two beams of coherent light emitted from the laser travel along the rectangular path in opposite directions. The positions of the mirrors and lasers are fixed with respect to each other and the system rotates as a unit. As a result of the Doppler effect, the light beam traveling in the direction of rotation is increased in frequency while the light beam traveling against the direction of rotation is decreased in frequency. The two light beams are extracted from the system and are examined by optical heterodyning techniques to determine the difference in frequency between the two beams. The difference in frequency between the two beams is directly related to and is a measure of the rate of rotation of the system.

This basic laser gyroscope is seriously limited in that it senses rate of rotation but does not sense direction of rotation. The output of the photodetector in the known laser gyroscope system varies in the same manner whether the system is rotating in one direction or in the opposite direction. Thus, the direction of rotation of the system cannot be determined from the output of the photodetector.

The present invention functions to impose a bias frequency on one of the beams extracted from the mirror and laser system through ultrasonic diffraction of the one beam. This beam with the imposed bias frequency is then compared through optical superheterodyning techniques with the frequency of the other beam extracted from the mirror and laser system, and an output signal is obtained equal to the bias frequency plus or minus the difference in frequency between the two beams extracted from the mirror and laser system. When the mirror and laser system is stationary, there is no frequency difference between the two emerging beams, and the signal output is merely equal to the bias frequency; when the mirror and laser system is rotating, the output signal will be equal to either the bias frequency plus the frequency difference between the emergent beams or the bias frequency minus the frequency difference between the emergent beams, depending upon the direction of rotation. Thus, the direction as well as the rate of rotation can be determined.

In the present invention the bias frequency is imposed on one of the emergent light beams through the use of an ultrasonic cell in the path of the emergent beam. The ultrasonic cell is energized at a frequency such that the ultrasonic wave length is much smaller than the diameter of the emergent beam (a ratio of at least 1:6) so that the emergent beam is diffracted in passing through the ultrasonic cell. Because of the Doppler effect the frequencies of the orders of the diffraction pattern differ from the frequency of the original light beam by multiples of the ultrasonic frequency, and one of the orders of the diffraction pattern is passed through a slit to form the frequency biased beam. This biased beam is then compared through optical heterodyning techniques with the other beam extracted from the mirror and laser system to obtain the desired signal.

Accordingly, one object of this invention is to provide a novel rotation rate and direction sensor system.

Another object of this invention is to provide a novel laser gyroscope system which is capable of sensing and indicating both rate and direction of rotation.

Still another object of the present invention is to provide a novel laser gyroscope system in which one of the two beams extracted from the laser and mirror system is diffracted to produce a biased beam for comparison with the other of the extracted beams so that both direction and rate of rotation can be sensed.

Other objects and advantages will be apparent from the specification and claims and from the accompanying drawings which illustrate an embodiment of the invention.

Figure 1:
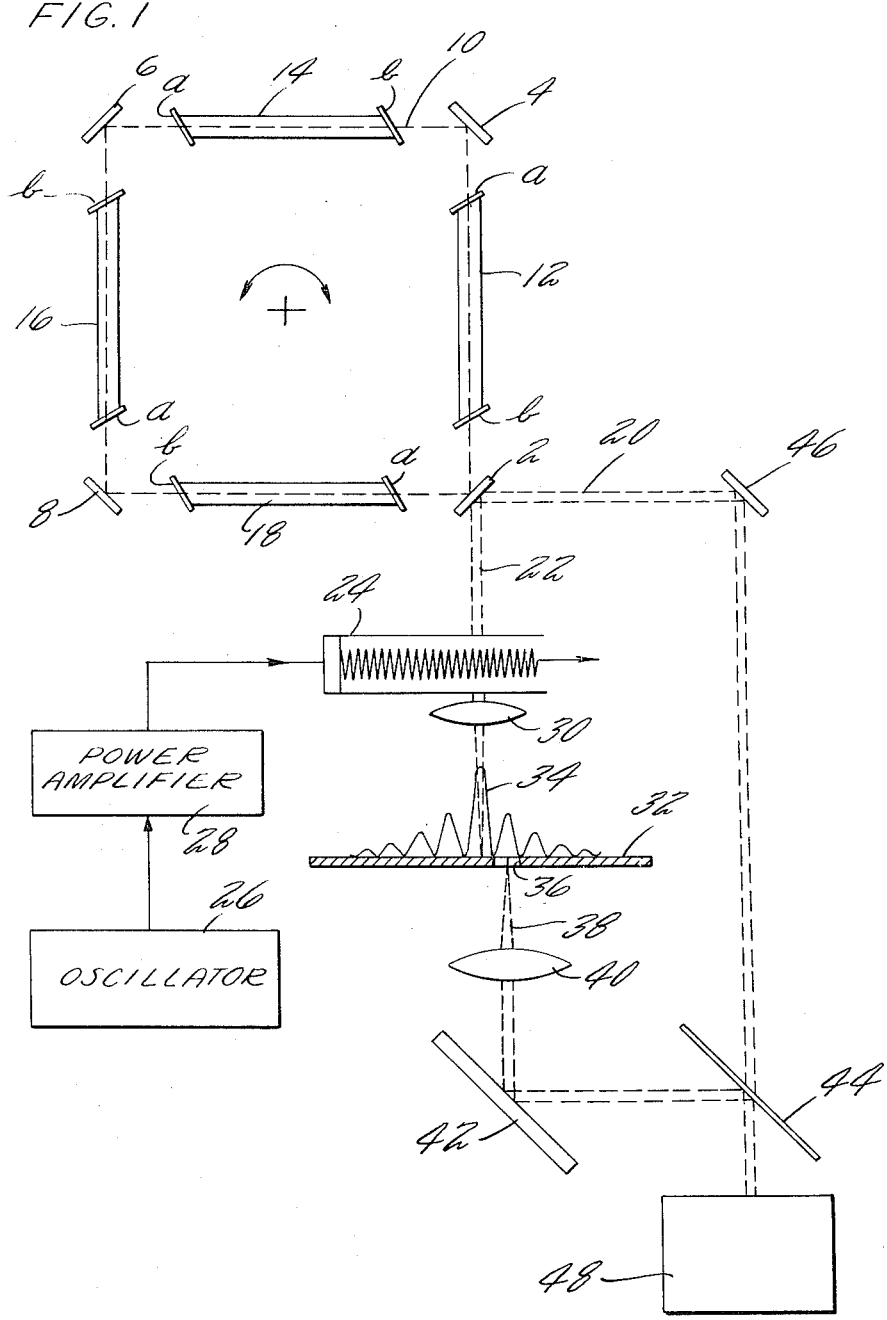
FIG. 1 is a schematic representation of the rotation rate and direction sensor of the present invention.

Referring now to FIG. 1, mirrors 2, 4, 6 and 8 are positioned at the corners of an imaginary square, each mirror being disposed at an angle of 45° to a diagonal of the square. With this construction mirrors 2 and 6 are parallel to each other and mirrors 4 and 8 are parallel to each other, and the mirrors combine to define the square reflecting path indicated by the dotted line 10. Continuous wave lasers such as helium-neon gas lasers 12, 14, 16 and 18, preferably with Brewster angle windows at each end, are placed in path 10 with the axis of each laser coincident with the center of path 10 and at an angle of 45° to the adjoining mirrors. A laser is shown between each two adjacent mirrors, but the number of lasers might be reduced to a minimum of one. The lasers are energized in the usual fashion, and each laser emits beams of coherent light from both ends, the beam from end $a$ of each laser traveling along path 10 in a counter-clockwise direction and the beam from end $b$ of each laser traveling along path 10 in a clockwise direction. Mirrow 2 is either less reflective than the other mirrors or is a half-silvered mirror so that two mutually perpendicular beams of coherent light 20 and 22 emerge from or are extracted from the mirror and laser system. Beam 22 is made up of coherent light that traveled along path 10 in the clockwise direction, and beam 20 is made up of coherent light that traveled along path 10 in the counterclockwise direction.

Figure 2:
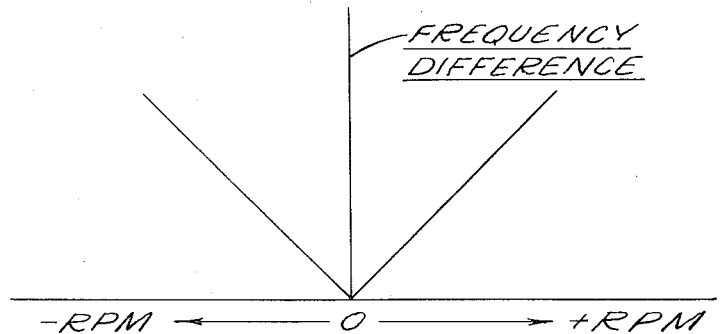
FIG. 2 is a graph of a typical output signal from previous laser gyroscopes.

The system described thus far is the known type of laser gyroscope reported by W. M. Macek and D. T. M. Davis, Jr. in Applied Physics Letters, vol. 2, February 1963. The lasers and mirrors are in fixed position with respect to each other and are all mounted on a body, such as an aircraft or ship, which may experience clockwise or counterclockwise rotation as shown by the arrows in FIG. 1. As described in the article by Macek and Davis, rotation of the laser and mirror system in either direction results in a difference in frequencies of the emergent beams, the frequency difference being caused by the rate of rotation, and this frequency difference can be detected to indicate the rate of rotation. However, this known laser gyroscope system does not distinguish direction of rotation. FIG. 2 shows the output which would be obtained from a photodetector upon beating the two emergent beams of the known system. Assuming that the plus sign indicates clockwise rotation and the negative sign indicates counterclockwise rotation, it can be seen from FIG. 2 that the frequency difference output signal from the photodetector will range from zero upward without regard to the direction of rotation. For a given rate of rotation in the clockwise direction the photodetector would indicate a certain frequency difference between the beams, and that same frequency difference would be indicated for that same rotation rate in the counterclockwise direction. Thus, the known system has the serious deficiency of failing to indicate direction of rotation.

In the present invention an ultrasonic cell 24, preferably having a liquid medium therein, is placed in the path of one of the emergent beams, beam 22 for example. A traveling wave of frequency $f^*$ is generated in ultrasonic cell 24, the wave length $\lambda^*$ of the ultrasonic wave being at least less than ⅛ the diameter of beam 22. The traveling wave is generated by driving ultrasonic cell 24 with the output of oscillator 26 operating at a frequency of $f^*$ and amplified by power amplifier 28.

Beam 22 is intercepted by the energy wave in ultrasonic cell 24, and the beam is diffracted because of changes in refractive index encountered by the beam in passing through the ultrasonic cell. The diffracted beam emerging from cell 24 is focused by lens 30 on mask 32, the intensity of the various orders of the diffraction pattern being shown representatively by distribution curve 34. A slit 36 in mask 32 permits the passage of one of the orders of the diffraction pattern, shown for purposes of illustration as the first order, and the first order of the diffraction pattern appears to originate as a point source at slit 36. The zero order of the diffraction pattern has a frequency $\gamma_1$, where $\gamma_1$ is the frequency of the beam 22 emerging from mirror 2, and the frequencies of the other orders of the diffraction pattern will be $\gamma_1 \pm Kf^*$, where K equals 1, 2, 3, etc. and corresponds to the orders of the diffraction pattern. Assuming that mask 32 passes the first positive order of the diffraction pattern, the frequency of beam 38 will be $\gamma_1 + f^*$. Beam 38 is collimated by lens 40 and directed to mirror 42 from which it is reflected to half-silvered mirror 44. Emergent beam 20 is reflected by mirror 46 to also impinge on half-silvered mirror 44, and both beam 20 and beam 38 are delivered by half-silvered mirror 44 to receiver 48 for beating and generation of an output signal by optical superheterodyning techniques such as discussed in the article by A. T. Forrester in the Journal of the Optical Society of America, vol. 51, No. 3, March 1961, pages 253–259. All of the apparatus depicted in FIG. 1 is mounted in fixed relation on the vehicle or structure whose rotation is to be monitored.

The diffraction of beam 22 and the passage of one order of the diffraction pattern in the form of beam 38 has the effect of imposing on beam 22 a bias frequency determined by the frequency of oscillator 26. This result is achieved since the frequency of beam 22 is $\gamma_1$ and the frequency of beam 38 is $\gamma_1 + f^*$.

Figure 3:
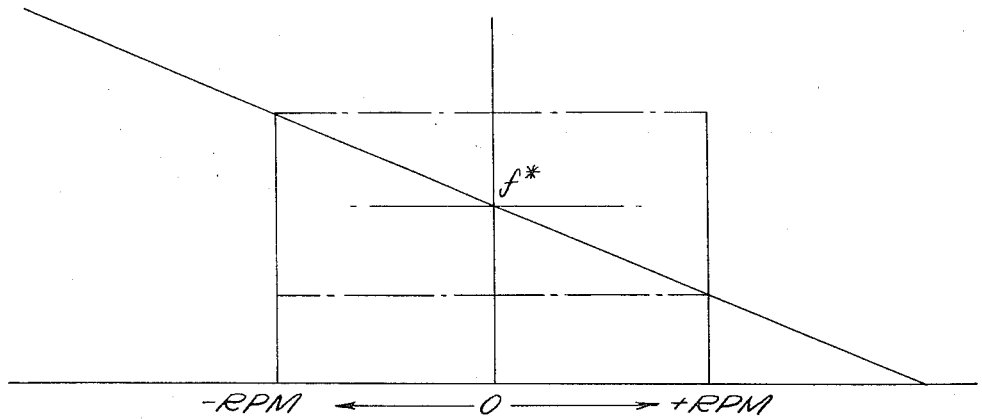
FIG. 3 is a graph of the output signal of the laser gyroscope of the present invention.

Beams 38 and 20 are delivered to superheterodyne optical receiver 48 and are combined or beat to obtain an output indicative of the difference in frequencies between beams 20 and 38. This output is illustrated in FIG. 3. If the system is not rotating the frequency $\gamma_1$ of beam 22 will equal the frequency $\gamma_2$ of beam 20, the frequency of beam 38 will be $\gamma_1 + f^*$, and the beat frequency indicated by receiver 48 will be $$\gamma_1 + f^* - \gamma_2 = \gamma_1 + f^* - \gamma_1 = f^*$$

Thus, for the condition of nonrotation receiver 48 will generate a signal equal to $f^*$. If the laser and mirror system is rotating, the frequency $\gamma_2$ of beam 20 will differ from the frequency $\gamma_1$ of beam 22 by an amount commensurate with the rate of rotation, i.e., $\gamma_2 = \gamma_1 \pm \Delta f$ where $\Delta f$ is dependent on the rate of rotation and the sense of the sign is dependent upon the direction of rotation. If rotation is counterclockwise, $\gamma_2$ will equal $\gamma_1 - \Delta f$; if rotation is clockwise, $\gamma_2$ will equal $\gamma_1 + \Delta f$.

Assuming rotation is counterclockwise, the input signals to receiver 48 will be $\gamma_1 + f^*$, and $\gamma_2$, where $\gamma_2$ equals $\gamma_1 - \Delta f$. Beating together these two signals will result in an output of $$\gamma_1 + f^* - \gamma_2 = \gamma_1 + f^* - (\gamma_1 - \Delta f) = \gamma_1 + f^* - \gamma_1 + \Delta f = f^* + \Delta f$$

This output is shown in the chart of FIG. 3 on the left-hand side of the zero line where —r.p.m. signifies counterclockwise rotation. $\Delta f$ varies directly with changes in counterclockwise rotation, and the output from receiver 48 varies from $f^*$ to values greater than $f^*$ in accordance with the rate of counterclockwise rotation. Conversely, if rotation is in the clockwise direction, $\gamma_2 = \gamma_1 + \Delta f$, the signals delivered to receiver 48 are $\gamma_1 + f^*$, and $\gamma_2$, where $\gamma_2$ equals $\gamma_1 + \Delta f$. The output signal from receiver 48 after beating these two inputs is $$\gamma_1 + f^* - (\gamma_1 + \Delta f) = \gamma_1 + f^* - \gamma_1 - \Delta f = f^* - \Delta f$$

Thus, the output signal from receiver 48 will vary from a value of $f^*$ to values less than $f^*$ for clockwise rotation.

At any given time, the difference between $f^*$ and the output signal from receiver 48 will be commensurate with the rate of rotation of the laser gyro system, and the sense of rotation will be determined by whether the output signal is more than or less than $f^*$. In this manner the output signal from receiver 48 is commensurate with both the rate of rotation of the laser gyroscope system and the direction of rotation.

It is to be understood that the invention is not limited to the specific embodiment herein illustrated and described but may be used in other ways without departure from its spirit as defined by the following claims.

I claim:

1. A rotation rate and direction sensor including a mirror system having a plurality of mirrors in fixed spaced relation to each other, said mirrors being positioned to define a path of light travel, at least one means between two of said mirrors in fixed relation with said mirrors for generating two coherent beams of light for travel along said path in opposite directions, said generating means and said mirror system being rotatable as a unit, means for extracting said light beams from said mirror system, said extracted beams differing in frequencies in an amount commensurate with the rate of rotation of said mirror system, an ultrasonic cell in the path of one of said extracted beams for imposing a frequency bias on said one extracted beam, and means for combining said biased beam with the other of said beams to obtain a signal commensurate with said bias frequency and said difference between the frequencies of said extracted beams, said signal being indicative of the rate and direction of rotation of said mirror system.

2. A rotation rate and direction sensor as in claim 1 wherein said generating means is a continuous wave laser element.

3. A rotation rate and direction sensor as in claim 1 and including means for generating an energy wave in said cell having a wave length less than the width of said one extracted beam.

4. A rotation rate and direction sensor as in claim 3 wherein said energy wave is a traveling wave.

5. A rotation rate and direction sensor including a mirror system having four mirrors in fixed spaced relation to each other and defining a rectangular light reflection path, means between two of said mirrors for generating two oppositely directed coherent light beams for traveling along said path in opposite directions, said mirror system and said generating means being rotatable as a unit, means for extracting said light beams from said mirror system, said extracted beams being at an angle to each other and differing in frequencies in an amount commensurate with the rate of rotation of said mirror system, means including an ultrasonic cell positioned in the path of one extracted beam for imposing a frequency bias on said one extracted beam to thereby produce a modulated beam differing in frequency from said other extracted beam by a predetermined amount, detector means for combining said modulated beam with the other of said extracted beams to obtain a signal commensurate with either the difference between said bias frequency and said difference in frequency between the extracted beams or the sum of said bias frequency and said difference in frequency between the extracted beams, said signal being indicative of the rate and direction of rotation of said mirror system, and means for delivering said modulated beam and the other of said extracted beams to said detector.

6. A rotation rate and direction sensor as in claim 5 wherein said generating means is a continuous wave laser element.

7. A rotation rate and direction sensor as in claim 5 and including means for generating an energy wave in said cell having a wave length less than the width of said one extracted beam to diffract said one extracted beam, and means for selecting one of the orders of the diffraction pattern of said diffracted beam to form said modulated beam.

8. A rotation rate and direction sensor including a mirror system having four mirrors in fixed spaced relation to each other and defining a rectangular light reflection path, at least one continuous wave laser element between two of said mirrors for generating two oppositely directed coherent light beams for traveling along said path in opposite directions, said mirror system and said laser element being rotatable as a unit, one of said mirrors being partially transparent so that said light beams emerge from said mirror system at an angle to each other, said emergent beams differing in frequency by an amount commensurate with the rate of rotation of said mirror system, an ultrasonic cell in the path of one of said emergent beams, means for generating an energy wave in said ultrasonic cell having a wave length less than the width of said one extracted beam to diffract said one extracted beam, means for focusing the pattern of said diffracted beam, a mask at the plane of focus of said pattern, said mask having an opening therein positioned to pass one of the orders of the diffraction pattern of said diffracted beam to produce a modulated beam differing in frequency from said one extracted beam by a bias frequency, means for combining said modulated beam with the other of said extracted beams, and means receiving said combined beams and generating a signal commensurate with either the difference between said bias frequency and the frequency difference between said emergent beams or the sum of said bias frequency and the frequency difference between said emergent beams, said signal being indicative of the rate and direction of rotation of said mirror system.

References Cited
UNITED STATES PATENTS 3,011,386  12/1961  Rosenthal _____ 88—14

OTHER REFERENCES

Electromagnetic Angular Rotation Sensing, Sperry Gyro. Corp., Contract No. AF 33 (657)–11433, Sperry Report #AB–1108–0016–1, September 1963, pp. 3–1, 5; pp. 4–1, 5 and FIG. 5–4 relied on.

JEWELL H. PEDERSEN, *Primary Examiner.*

B. LACOMIS, *Assistant Examiner.*